United States Patent [19]

Gerbier et al.

[11] 3,970,475
[45] July 20, 1976

[54] PRIMARY CELL, IN WHICH THE POSITIVE ACTIVE MATERIAL IS SILVER CHROMATE

[75] Inventors: Gérard Gerbier; Jean-Paul Rivault, both of Poitiers, France

[73] Assignee: Saft-Societe des Accumulateurs Fixes et de Traction, Romainville, France

[22] Filed: Oct. 22, 1974

[21] Appl. No.: 516,962

[30] Foreign Application Priority Data
Oct. 29, 1973 France .............................. 73.38506

[52] U.S. Cl. .......................... 136/100 R; 136/6 LN; 136/137
[51] Int. Cl.² .......................................... H01M 6/00
[58] Field of Search .............. 136/100 R, 137, 6 LN

[56] References Cited
UNITED STATES PATENTS

| | | |
|---|---|---|
| 3,279,952 | 10/1966 | Minnick .......................... 136/100 R |
| 3,468,716 | 9/1969 | Eisenberg ......................... 136/100 R |
| 3,658,592 | 4/1972 | Dey ................................ 136/83 R X |
| 3,796,604 | 3/1974 | Gabano et al. ................. 36/100 R X |
| 3,853,627 | 12/1974 | Lehmann et al. ........... 136/100 R X |

*Primary Examiner*—John H. Mack
*Assistant Examiner*—C. F. Lefevour
*Attorney, Agent, or Firm*—Kenyon & Kenyon Reilly Carr & Chapin

[57] ABSTRACT

Primary cell, in which the positive active material is silver chromate and in which the electrolyte may be constituted by a lithium perchlorate solution in propylene carbonate. According to the invention silver powder is added to the silver chromate in a proportion comprised between 5% and 30% by weight. A primary cell thus obtained may be used in an environment having a high temperature, such as an electrical device whose components heat up without any possibility of cooling.

7 Claims, 1 Drawing Figure

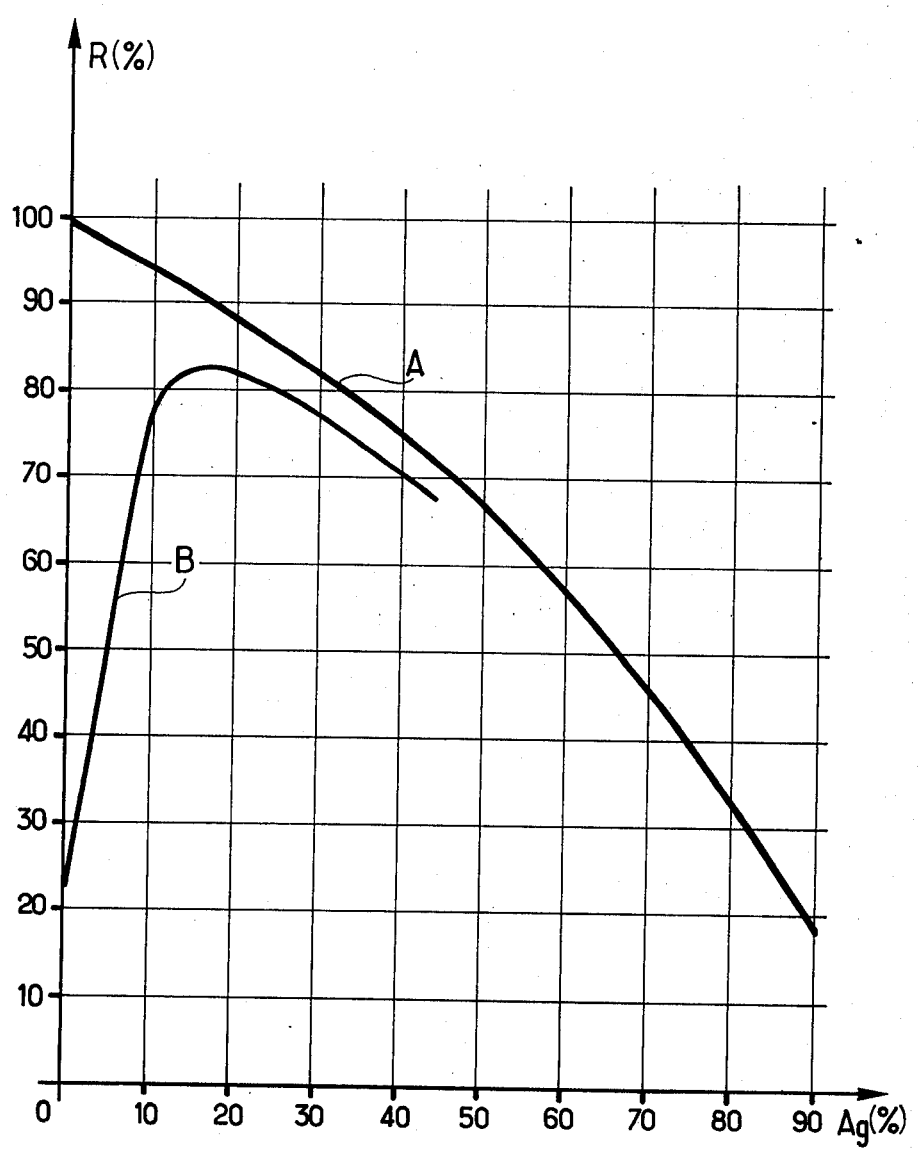

PRIMARY CELL, IN WHICH THE POSITIVE ACTIVE MATERIAL IS SILVER CHROMATE

BRIEF SUMMARY OF THE INVENTION

The invention relates to primary cells in which the positive active materials are oxidized metallic compounds reduced to the metallic state during the discharge and more particularly primary cells in which the positive active material is silver chromate.

It has been observed, in such primary cells, where lithium, as the negative active material, is opposed to the silver chromate positive active material and in which the electrolyte is constituted by a lithium perchlorate solution in propylene carbonate, that the shelf life at a high temperature (up to 100°C) was excellent. Indeed, after storage at 90°C for more than a month, the discharge of such cells shows a normal efficiency of about 60% when that discharge takes place at ambient temperature.

Unfortunately, this is no longer the case when discharge takes place at the storage temperature, that is, at 90°C. The efficiency is then only 22%.

The present invention makes it possible to overcome that disadvantage.

It has among its objects the provision of a primary cell in which the positive active material is silver chromate, characterized in that the positive active mass also contains silver powder incorporated into it in the preparation of the positive active material.

According to an embodiment of the invention which is a great advantage, the quantity of silver powder contained in the active mass is comprised between 5% and 30% by weight; in a preferred embodiment close to 12% by weight.

The invention will be better understood from the following description of an example of application of the present invention to the manufacturing of silver chromate primary batteries; reference will be made to the single accompanying figure giving the curves of the efficiencies for primary cells embodying the invention.

Button-sized lithium-silver chromate primary cells are known in which the negative electrode is made of lithium and the non-aqueous electrolyte is a lithium perchlorate solution in propylene carbonate and in which the positive electrode is a compressed powder mixture of about 99% by weight of silver chromate $Ag_2CrO_4$ and about 1% by weight of carbon black. Such cells for test purposes were discharged through a resistance of 30,000 ohms up to an end voltage of 2.9 volts at increasing temperatures. It was observed in these tests that when the temperature was increased from 70° to 90°C, the efficiency of such a cell fell from 67% to 22%. An examination of the discharged cells showed that at a high temperature, silver chromate reduced to the state of silver by the discharge formed a compact barrier preventing the continuation of the electrochemical exchanges.

In a cell having like shape and overall dimensions, the positive mass was replaced by a similar mass to which 10% by weight of silver powder was added and, in another cell having the same shape and overall dimensions by a mass to which 30% by weight of silver powder was added. As to this silver powder, about 75% of said powder had a grain size of less than 100 microns and an apparent density of about 1.5. The efficiencies of these cells discharged at 90°C under the same conditions were respectively found to be equal to 81% and 93% with respect to the theoretical capacity of silver chromate content. The full advantage of adding silver powder to the active mass thus is apparent. It is probable that each grain of silver acts as a nucleus for the crystallizing of the silver formed when the chromate is reduced during the discharge of the cell. In this way, instead of agglomerating in a compact mass, the silver crystallizes throughout the mass in the dispersed state. It is to be understood, however, that grain size of the silver powder is not a significant parameter since grains of any size would act as nuclei for crystallization of silver during cell discharge. Indeed, fine sizes would provide a greater number of nuclei. The important thing, however, it to obtain a discontinuous formation of silver and this would result as well with a smaller number of nuclei.

The advantages of the present invention will become more clearly apparent from the single FIGURE showing a diagram of the efficiencies of the cells according to the invention. The percentages of silver initially incorporated in the active mass are shown in the abscissae and the capacity of the cells referred to 100, that is, the efficiencies R of the cells are shown in the ordinates.

DETAILED DESCRIPTION

Curve A shows the theoretical capacities of the active masses to which silver powder has been added, at a constant volume, the capacity being 100 (or the efficiency R being 100%) for an active mass without any silver added to it.

Curve B shows the actual efficiencies for discharges at 90°C. For a zero silver content, the aforementioned efficiency of 22% is seen clearly. The two previously calculated efficiencies of 81% and 93% have been referred to the theoretical capacities of the active mass for the corresponding percentage of silver powder.

Thus, for 10% content of silver powder, the calculated efficiency is 81%, the theoretical capacity is 94.7% and the actual efficiency as seen from curve B is 76.7%.

Likewise, in the case of 30%, the calculated efficiency is 93%, the theoretical capacity is 82.3% and the actual efficiency as seen from curve B is 76.5%.

It is quite evident that the powdered silver content of the positive active material will be made to vary according to the temperature at which the discharge of a particular cell is to take place and according to the efficiency which may be tolerated, each temperature corresponding to a different curve B, of which curve A constitutes, in a way, the envelope. As a whole, the powdered silver contents which are used to greatest advantage are situated between 5 and 15% by weight of the mass of positive active material. It is the most advantageous indeed, to make use of the ascending part of the curve B if silver powder is a more expensive material than silver chromate. Good results are obtained with an approximately 12% content wherein as seen from curve B the actual efficiency R approximates 80%.

The electrolyte herein specified is not the only one that may be used, other electrolytes such as those described in application Ser. No. 137,845, Lehmann, et al. filed Apr. 27, 1971 now U.S. Pat. No. 3,853,667 issued Dec. 10, 1974 and in Dey U.S. Pat. No. 3,658,592 would also be useful. In addition, since silver powder is an electronic conductor, it may be possible to eliminate carbon black from the positive active material, or even the graphite component described in said Dey patent where the other components of the positive active material are silver chromate and silver powder.

This invention applies to primary cells used in an environment where a high temperature prevails, such as an electrical device whose components heat up without any possibility of cooling thereof.

Although specific embodiment of the invention have been disclosed, variations in practice within the scope of the appended claims are possible and are contemplated. There is no intention, therefore, of limitation to the exact disclosure herein presented.

What is claimed is:

1. Primary non-aqueous electrolyte cell having high efficiency of discharge at high temperatures above 70° to at least 90°C. in which the positive active mass is silver chromate, characterized in that the positive active mass contains between 5% and 30% by weight of silver powder.

2. Primary cell according to claim 1, characterized in that the said quantity of silver powder contained in the active mass is close to 12% by weight.

3. A primary cell providing high efficiency of discharge at high temperatures above 70° to at least 90°C. and comprising a non-aqueous electrolyte, a lithium base negative electrode and a positive electrode comprising silver chromate and between 5% and 30% by weight of silver powder.

4. A primary cell according to claim 3 wherein said non-aqueous electrolyte comprises lithium perchlorate solution in propylene carbonate and in which said positive electrode comprises a compressed mixture of said silver chromate and silver powder.

5. A primary cell according to claim 4 wherein said compressed mixture comprises about 10–30% by weight of said silver powder.

6. A primary cell according to claim 4 wherein said compressed mixture contains about 12% by weight of said powdered silver.

7. A primary cell providing efficiency substantially higher than 60% and up to at least 80% at storage and discharge temperatures of at least 90°C., comprising a lithium base negative electrode, non-aqueous electrolyte and a positive electrode consisting of silver chromate and from 5–30% by weight of silver powder.

* * * * *